(12) United States Patent
Chan

(10) Patent No.: US 9,298,322 B2
(45) Date of Patent: Mar. 29, 2016

(54) TOUCH PANEL AND METHOD FOR FABRICATING THE SAME

(75) Inventor: Winston Chan, Hong Kong (HK)

(73) Assignee: Winsky Technology Limited, Hong Kong (HK)

( * ) Notice: Subject to any disclaimer, the term of this patent is extended or adjusted under 35 U.S.C. 154(b) by 905 days.

(21) Appl. No.: 13/046,244

(22) Filed: Mar. 11, 2011

(65) Prior Publication Data

US 2011/0273386 A1    Nov. 10, 2011

(30) Foreign Application Priority Data

May 4, 2010 (TW) ................ 99114276 A

(51) Int. Cl.
   *B32B 17/06*    (2006.01)
   *B05D 5/12*    (2006.01)
   *C03C 21/00*    (2006.01)
   *G06F 3/044*    (2006.01)

(52) U.S. Cl.
   CPC ...... *G06F 3/044* (2013.01); *G06F 2203/04103* (2013.01)

(58) Field of Classification Search
USPC ......... 428/426, 428, 432, 688, 689, 699, 701, 428/702, 410; 65/30.13, 30.14; 427/446, 427/559
See application file for complete search history.

(56) References Cited

U.S. PATENT DOCUMENTS

| | | |
|---|---|---|
| 2003/0192348 A1 | 10/2003 | Kudoh et al. |
| 2005/0095866 A1 | 5/2005 | Toyoda |
| 2005/0179668 A1 | 8/2005 | Edwards |
| 2005/0221044 A1* | 10/2005 | Gaume et al. ................ 428/43 |
| 2007/0291963 A1 | 12/2007 | Watanabe et al. |
| 2008/0165158 A1* | 7/2008 | Hotelling et al. ............ 345/174 |
| 2009/0096757 A1* | 4/2009 | Hotelling et al. ............ 345/173 |
| 2009/0096759 A1* | 4/2009 | Nishiwaki et al. ........... 345/173 |
| 2009/0160796 A1* | 6/2009 | Jiang et al. .................. 345/173 |
| 2009/0160819 A1 | 6/2009 | Sasaki et al. |
| 2009/0197048 A1 | 8/2009 | Amin et al. |
| 2009/0197088 A1* | 8/2009 | Murata ........................ 428/410 |
| 2009/0325776 A1* | 12/2009 | Murata .......................... 501/66 |
| 2010/0053114 A1* | 3/2010 | Kaigawa ..................... 345/174 |
| 2010/0119846 A1* | 5/2010 | Sawada ........................ 428/426 |

(Continued)

FOREIGN PATENT DOCUMENTS

| | | |
|---|---|---|
| CN | 101553776 | 10/2007 |
| CN | 101089803 | 12/2007 |

(Continued)

OTHER PUBLICATIONS

Wang et al., "Annealing effect on ITO films prepared by DC magnetron sputtering," Material Science &Technology, vol. 16, vol. 2, Apr. 2008. (English language abstract included).

(Continued)

*Primary Examiner* — Humera Sheikh
*Assistant Examiner* — Lauren Colgan
(74) *Attorney, Agent, or Firm* — Hamre, Schumann, Mueller & Larson, P.C.

(57) ABSTRACT

A touch panel and a method for fabricating the same are presented. The method includes the following steps. A glass substrate is strengthened through a chemical method. The glass substrate includes alkali oxide. An indium tin oxide (ITO) layer is formed below the glass substrate. A sensing circuit, a driving circuit, and an interconnection circuit therebetween are formed in the ITO layer.

18 Claims, 2 Drawing Sheets

(56) References Cited

U.S. PATENT DOCUMENTS

| | | | |
|---|---|---|---|
| 2010/0328228 A1* | 12/2010 | Elias | 345/173 |
| 2011/0007020 A1* | 1/2011 | Hong et al. | 345/174 |
| 2011/0014475 A1 | 1/2011 | Murata | |
| 2011/0274916 A1* | 11/2011 | Murata | 428/332 |

FOREIGN PATENT DOCUMENTS

| | | |
|---|---|---|
| CN | 101337770 | 1/2009 |
| JP | 2001-075731 | 3/2001 |
| JP | 2004-131314 | 4/2004 |
| TW | 200307871 | 12/2003 |
| TW | 200511887 | 3/2005 |
| TW | 200620078 | 6/2006 |
| TW | 200922899 | 6/2009 |
| TW | M358362 | 6/2009 |

OTHER PUBLICATIONS

Office Action issued Aug. 10, 2015 in corresponding Taiwan patent application (6 pages total).

* cited by examiner

TOUCH PANEL AND METHOD FOR FABRICATING THE SAME

FIELD OF THE INVENTION

The present invention relates to a touch panel, and more particularly to a capacitive touch panel.

DESCRIPTION OF THE PRIOR ART

FIG. 1A shows a conventional capacitive touch panel 100. In addition to a liquid crystal and a color filter, at least an extra glass substrate 101 is needed for a touch circuit. Indium tin oxide (ITO) 102, 103 serving as a sensing unit and a driving unit are provided at two sides of the glass substrate. The upper-layer ITO 102 and the lower-layer ITO 103 are perpendicularly arranged. Ultraviolet (UV) film optical cement 105 is applied between the glass substrate 101 and a panel 104. The glass substrate 101 and the panel 104 are then bonded in a vacuum manner. FIG. 1B is a sectional view of the conventional capacitive touch panel.

The popularity of light weight, compact electronic devices drives industrial demand for ever-smaller, lighter and thinner components. However, potential reductions in the thickness of conventional touch panels are constrained by the fact that the panel substrates and the touch circuit are independent from each other.

Further design constraints are imposed by concerns for durability and circuit integrity. The touch panel surface needs to bear pressure exerted from outside the panel, which may adversely influence the circuit if is formed directly on the panel 104. Repeated pressing of the panel 104 may result in cracks in the panel and even damage to internal circuitry. Therefore, there is urgent need for a structure and a process capable of while enhancing touch panel strength and integrating elements and substrates.

SUMMARY OF THE INVENTION

The present invention is to integrate a touch circuit of a touch panel onto a panel and increase the strength of the touch panel, so as to reduce the number of substrates to be bonded, thereby avoiding problems caused by substrate bonding and effectively decreasing the overall thickness of the touch panel.

In an embodiment, the present invention provides a method for fabricating a touch panel, which includes the following steps. A glass substrate is strengthened through a chemical method. The glass substrate includes alkali oxide. An ITO layer is formed below the glass substrate. A sensing circuit, a driving circuit, and an interconnection circuit therebetween are formed in the ITO layer.

In another embodiment, the present invention provides a touch panel, which includes a glass substrate strengthened through a chemical method and an ITO layer formed below the glass substrate. The glass substrate includes 60 wt % to 80 wt % silicon oxide, 1 wt % to 15 wt % aluminum oxide, and 0.1 wt % to 15 wt % alkali oxide ($M_2O$). A sensing circuit, a driving circuit, and an interconnection circuit therebetween are formed in the ITO layer.

DETAILED DESCRIPTION

Figure 1A:
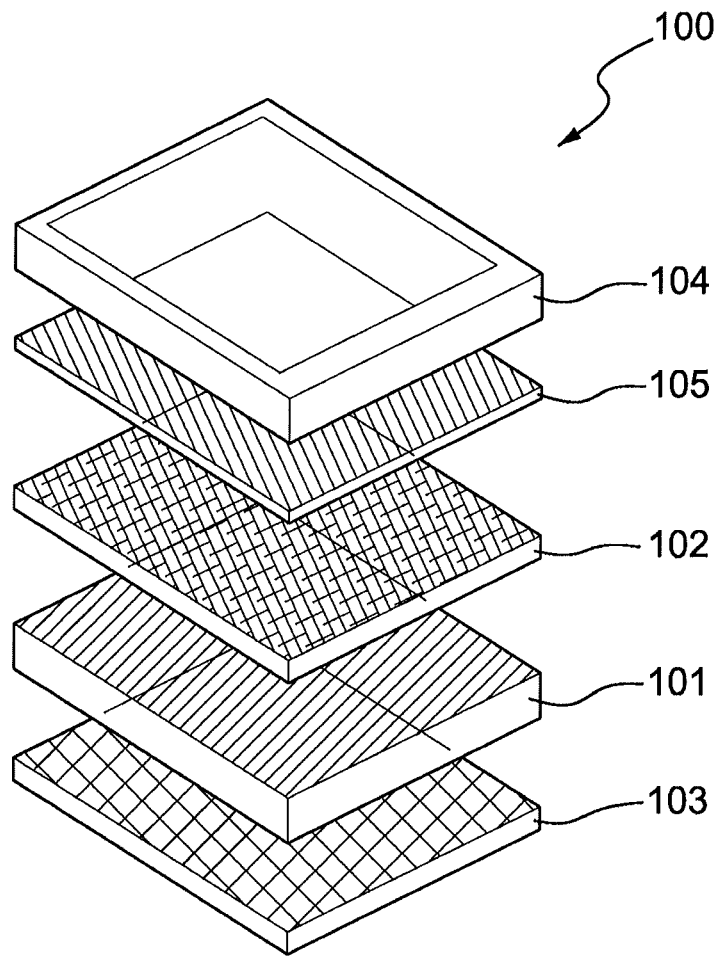
FIG. 1A shows a conventional capacitive touch panel.
Figure 1B:
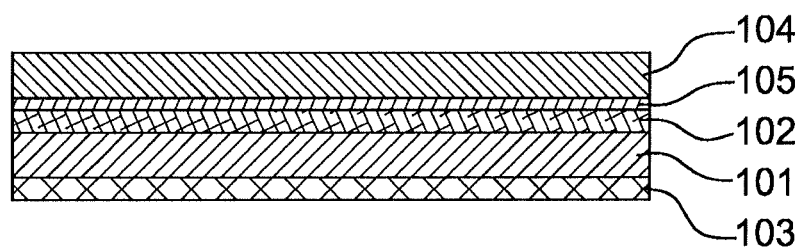
FIG. 1B is a sectional view of the conventional capacitive touch panel.
Figure 2:
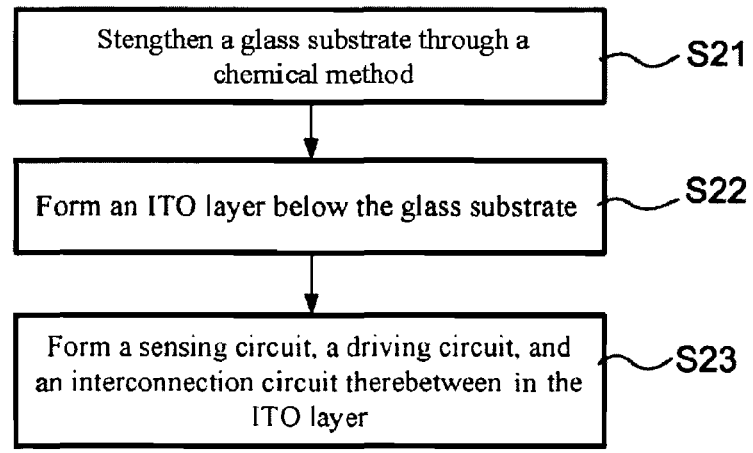
FIG. 2 shows a method for fabricating a touch panel according to an embodiment of the present invention.

FIG. 2 is a flow chart of a method for fabricating a touch panel according to the present invention. Firstly, a glass substrate is provided, which includes alkali oxide ($M_2O$). The glass substrate is strengthened through a chemical method. Compressive stress is formed on upper and lower surfaces of the glass substrate strengthened through the chemical method. An ITO layer is formed below the glass substrate, and it is ensured that stress of the formed ITO layer is approximately equal to the stress on the surface of the glass substrate strengthened through the chemical method, so as to form an ITO layer of compressive stress, thereby maintaining the strengthened surface of the glass substrate. Subsequently, a sensing circuit, a driving circuit, and an interconnection circuit therebetween of the touch panel are formed in the ITO layer.

In a preferred embodiment, the provided glass substrate includes 60 wt % to 80 wt % silicon oxide, 1 wt % to 15 wt % aluminum oxide, and 0.1 wt % to 15 wt % alkali oxide. In another preferred embodiment, the glass substrate further includes at least one of calcium oxide, magnesium oxide, iron oxide, boron oxide, sulfur oxide, and the like. The content of the calcium oxide in the glass substrate may be up to 13 wt %, the content of the magnesium oxide may be up to 13 wt %, and the contents of the iron oxide, the boron oxide, and the sulfur oxide may be up to 1 wt %, respectively.

In a preferred embodiment, the alkali oxide in the glass substrate is lithium oxide ($Li_2O$) and sodium oxide ($Na_2O$). In another preferred embodiment, the glass substrate is immersed in a high temperature nitrous acid or nitric acid solution. A chemical reaction takes place between the nitrous acid or nitric acid solution and the glass substrate to strengthen the glass substrate. Potassium ions in the solution enter the glass substrate and replace alkali metal ions in the glass substrate. For example, the glass substrate has $Li_2O$ and/or $Na_2O$, and the potassium ions exchange with lithium ions and/or sodium ions. The potassium ion has a larger ionic radius compared with the lithium ions and the sodium ions, so when the potassium ions enter the glass substrate, the $Li_2O$ and/or the $Na_2O$ on the surface of the glass substrate are replaced by potassium oxide, so as to form compressive stress on the surface of the glass substrate.

In an embodiment, after the glass substrate is strengthened through the chemical method, it can be learned that the compressive stress on the surface of the glass substrate is greater than 8 GPa through a 4 point-bending test. In a preferred embodiment, the compressive stress on the surface of the glass substrate is about 9 GPa.

Figure 3:
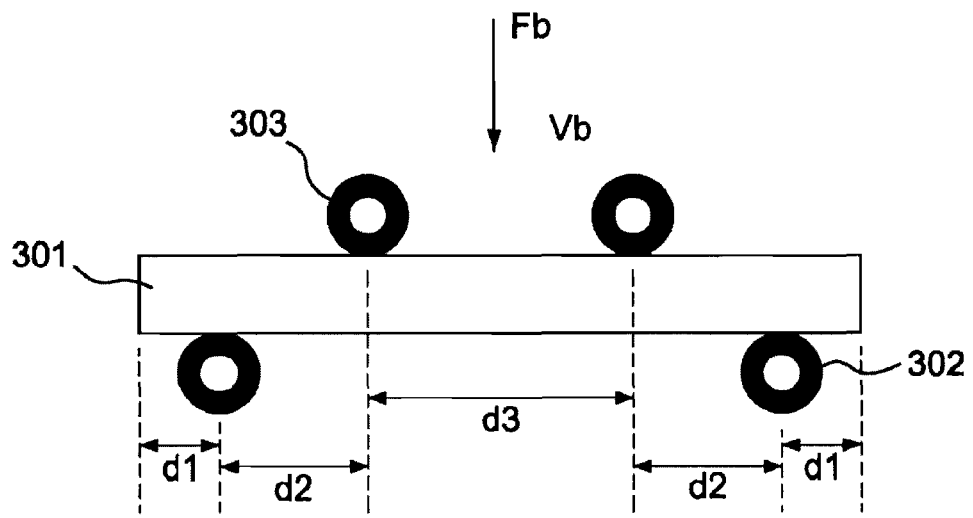
FIG. 3 shows a 4 point-bending test method.

The 4 point-bending test method is as shown in FIG. 3. A glass substrate 301 is strengthened through a chemical method and placed on two support bars 302. A distance d1 between the support bar and an edge of the glass substrate 301 is adjusted to about 9 mm. Two load bars 303 are placed above the glass substrate 301 and a distance d3 between the two load bars 303 is about 32 mm. A distance d2 between the load bar 303 at a left or right side of the glass substrate and the support bar 302 at the same side is about 16 mm. A stress Fb is gradually applied on the glass substrate 301 with a velocity Vb of 10 mm/min at the two load bars 303. 10% cumulative damage occurs and the stress on the surface of the glass substrate is obtained through Weibull analysis. The thickness of the glass substrate for test is 0.55 mm.

In a preferred embodiment, the formation of the sensing circuit, the driving circuit, and the interconnection circuit therebetween in the touch panel further includes patterning the ITO layer formed below the glass substrate through laser printing.

In a preferred embodiment, laser conditions used in laser printing for patterning the ITO layer include UV radiation of a Q-switch continuous wave laser having a radiation wavelength of 355 nm, a linear scanning velocity of about 1000 mm/sec, and energy smaller than 3 W.

In another preferred embodiment, laser conditions used in laser printing for patterning the ITO layer include pulse UV radiation having a radiation wavelength of 532 nm, a linear scanning velocity of about 120 mm/sec, and energy smaller than 120 mW.

In a further preferred embodiment, laser conditions used in laser printing for patterning the ITO layer include infrared radiation having a wavelength of about 1064 nm, a frequency of 20 kHZ, a linear scanning velocity of about 100 mm/sec to 500 mm/sec, and energy of about 100 mW to 800 mW.

In a preferred embodiment, a light absorption rate of the radiation used for patterning the ITO layer by the glass substrate itself is about 15%. In another preferred embodiment, the light absorption rate of the radiation by the ITO layer formed on the glass substrate is from about 8% to about 10%. Taking a glass substrate having thickness of 0.55 mm as an example, radiation conditions are controlled to make the local temperature of an irradiation region of radiation raised by no more than 2.4 K, so as not to damage the compressive stress formed after the glass substrate is strengthened.

In another embodiment of the present invention, the sensing circuit, the driving circuit, and the interconnection circuit therebetween are formed in the ITO layer by printing conductive ink onto the glass substrate in an ink jet manner. In a preferred embodiment, after the circuit is formed in an ink jet manner, the touch panel is annealed and the annealing temperature does not exceed 205° C.

The sensing circuit, the driving circuit, and the interconnection circuit therebetween are formed through laser printing or in an ink jet manner, and it can be learned through the 4 point-bending test that the surface of the touch panel still maintains compressive stress, which is approximately equal to the compressive stress achieved by the chemical method. It can be seen from the above that the laser printing or ink jet manner may not damage the compressive stress after the surface of the glass substrate is strengthened the strength of the glass substrate is maintained. Therefore, the touch panel of the present invention has reliable strength, so that the sensing circuit, the driving circuit, and the interconnection circuit therebetween below the glass substrate are protected when the touch panel is in use, pressure from the other side of the glass substrate may not affect electrical properties of the sensing circuit, the driving circuit, and the interconnection circuit therebetween, and damage to the circuit is prevented.

Although the technical solutions and features of the present invention are illustrated above, persons skilled in the art can still make various modifications and variations without departing from the teachings and disclosure of the present invention. Thus, the scope of the present invention is not limited to the disclosed embodiments but includes other modifications and variations without departing from the present invention as defined by the appended claims.

I claim:

1. A touch panel, comprising:
    a glass substrate having a first surface serving as a touched surface and a second surface opposite to the first surface, strengthened through a chemical method, and comprising 60 wt % to 80 wt % silicon oxide, 1 wt % to 15 wt % aluminum oxide, and 0.1 wt % to 15 wt % alkali oxide, wherein the glass substrate has a compressive stress greater than 8 GPa measured by a 4 point-bending test; and
    an indium tin oxide (ITO) layer formed on the second surface of the glass substrate, wherein a sensing circuit, a driving circuit, and an interconnection circuit therebetween are formed in the ITO layer.

2. The touch panel according to claim 1, wherein the glass substrate further comprises at least one of calcium oxide, magnesium oxide, iron oxide, boron oxide, and sulfur oxide.

3. The touch panel according to claim 1, wherein the sensing circuit, the driving circuit, and the interconnection circuit are formed by laser printing or ink jet printing.

4. The touch panel according to claim 1, wherein a light absorption rate of the radiation by the glass substrate is about 15%.

5. The touch panel according to claim 1, wherein a range of the light absorption rate of the radiation by the ITO layer is between about 8% and about 10%.

6. The touch panel according to claim 1, wherein no other substrate is present on or above the first surface of the glass substrate.

7. A method for fabricating a touch panel, comprising:
    strengthening a glass substrate through a chemical method, wherein the glass substrate has a first surface serving as a touched surface and a second surface opposite to the first surface and wherein the glass substrate comprises 60 wt % to 80 wt % silicon oxide, 1 wt % to 15 wt % aluminum oxide, and 0.1 wt % to 15 wt % alkali oxide, and wherein the glass substrate has a compressive stress greater than 8 GPa measured by a 4 point-bending test;
    forming an indium tin oxide (ITO) layer below the glass substrate; and
    forming a sensing circuit, a driving circuit, and an interconnection circuit therebetween in the ITO layer.

8. The method according to claim 7, wherein the chemical method comprises: immersing the glass substrate in a high temperature nitrous acid or nitric acid solution.

9. The method according to claim 7, wherein the sensing circuit, the driving circuit, and the interconnection circuit therebetween are formed by laser printing.

10. The method according to claim 9, wherein conditions of the laser printing comprise UV radiation of a Q-switch continuous wave laser having a radiation wavelength of 355 nm, a linear scanning velocity of about 1000 mm/sec, and energy smaller than 3 W.

11. The method according to claim 9, wherein conditions of the laser printing comprise pulse UV radiation having a radiation wavelength of 532 nm, a linear scanning velocity of about 120 mm/sec, and energy smaller than 120 mW.

12. The method according to claim 9, wherein conditions of the laser printing comprise infrared radiation having a wavelength of about 1064 nm, a frequency of 20 kHz, a linear scanning velocity of about 100 mm/sec to 500 mm/sec, and energy of about 100 mW to 800 mW.

13. The method according to claim 9, wherein a light absorption rate of the radiation by the glass substrate is about 15%.

14. The method according to claim 13, wherein a range of the light absorption rate of the radiation by the ITO is from about 8% to about 10%.

15. The method according to claim 7, wherein the sensing circuit is formed by printing conductive ink onto the glass substrate in an ink jet manner.

16. The method according to claim 15, further comprising an annealing process, wherein the temperature is lower than 205° C.

17. The method according to claim 7, wherein the glass substrate has a surface stress of about 9 GPa.

18. The method according to claim 7, wherein the glass substrate comprises aluminum oxide, and the alkali oxide comprises lithium oxide ($Li_2O$) and/or sodium oxide ($Na_2O$).

* * * * *